(12) United States Patent
Kudo (10) Patent No.: US 12,165,364 B2
(45) Date of Patent: Dec. 10, 2024

(54) IMAGE ANALYSIS APPARATUS, IMAGE ANALYSIS METHOD, AND NON-TRANSITORY COMPUTER-READABLE STORAGE MEDIUM

(71) Applicant: SEIKO EPSON CORPORATION, Tokyo (JP)

(72) Inventor: Kei Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 478 days.

(21) Appl. No.: 17/495,397

(22) Filed: Oct. 6, 2021

(65) Prior Publication Data

US 2022/0114760 A1   Apr. 14, 2022

(30) Foreign Application Priority Data

Oct. 9, 2020   (JP) ................. 2020-170963

(51) Int. Cl.
*G06T 7/90* (2017.01)
*G01J 3/28* (2006.01)

(52) U.S. Cl.
CPC ............ *G06T 7/90* (2017.01); *G01J 3/2823* (2013.01); *G01J 2003/2826* (2013.01); *G06T 2207/10024* (2013.01)

(58) Field of Classification Search
CPC ......... G06T 15/50; G06T 5/503; G06T 15/60; G06T 5/80; G06T 2207/00; G06T 2207/10024; G06T 2207/10036; G06T 2207/10048; G06T 2207/10052; G06T 2207/20212; G06T 2207/20216; G06T 2207/20221; G06T 7/90; G06T 2207/20104; G06T 7/0002; G01J 3/2823; G01J 2003/2826
USPC .................................................. 382/100, 165
See application file for complete search history.

(56) References Cited

U.S. PATENT DOCUMENTS

| 5,834,203 | A | * | 11/1998 | Katzir | ............... G01N 21/6458 252/582 |
| 10,964,062 | B2 | | 3/2021 | Yoshida | |
| 2006/0245631 | A1 | * | 11/2006 | Levenson | .......... G06V 10/7715 382/133 |

(Continued)

FOREIGN PATENT DOCUMENTS

| JP | 2004206498 A | | 7/2004 |
| JP | 2004280591 A | * | 10/2004 |

(Continued)

OTHER PUBLICATIONS

Office Action for JP Patent Application No. JP2020170963, issued on May 14, 2024 11 pages of Office Action.

*Primary Examiner* — Sheela C Chawan
(74) *Attorney, Agent, or Firm* — CHIP LAW GROUP (57) ABSTRACT

An image analysis apparatus includes one or more processors configured to execute (a) acquiring, from a measurement device, spectral images for a plurality of wavelengths, obtained by imaging a measurement target, (b) acquiring a target range in each of the spectral images, (c) performing multivariate analysis of each pixel based on a gradation value of the pixel for each wavelength in the target range, (d) generating an analysis image including an analysis result of the multivariate analysis for each pixel in the target range, and (e) storing the generated analysis image into a memory.

8 Claims, 7 Drawing Sheets

(56) References Cited

U.S. PATENT DOCUMENTS

2012/0133671 A1* 5/2012 Setou .................... G06T 7/0012
                                                      345/593
2014/0218735 A1   8/2014 Tatsuda
2018/0204353 A1   7/2018 Yoshida
2021/0409679 A1* 12/2021 Kanai .................. H04N 17/002

FOREIGN PATENT DOCUMENTS

| JP | 2014153066 A | 8/2014 |
| JP | 2015040818 A | 3/2015 |
| WO | 2017056980 A1 | 4/2017 |

* cited by examiner

IMAGE ANALYSIS APPARATUS, IMAGE ANALYSIS METHOD, AND NON-TRANSITORY COMPUTER-READABLE STORAGE MEDIUM

The present application is based on, and claims priority from JP Application Serial Number 2020-170963, filed Oct. 9, 2020, the disclosure of which is hereby incorporated by reference herein in its entirety.

BACKGROUND

1. Technical Field

The present disclosure relates to an image analysis apparatus, an image analysis method, and a non-transitory computer-readable storage medium storing an image analysis program.

2. Related Art

In the related art, there is an image analysis apparatus that images a target object with a spectral camera and analyzes the spectral image obtained through the imaging (refer to, for example, JP-A-2014-153066).

An image analysis apparatus (measurement device) disclosed in JP-A-2014-153066 includes an optical sensor section capable of capturing 16-band spectral images. In this measurement device, three-band spectral images corresponding to, for example, red (R), blue (B), and green (G) are captured by the optical sensor section, and these images are combined to generate a real-time image that is displayed on a display section. When a part of the real-time image is designated by a user, for example, a range of 10×10 including a designated position is set as a colorimetric region, and 16-band spectral images of only the colorimetric region are captured. An average light amount value of all pixels of the spectral image in the colorimetric region obtained from a colorimetric result is calculated for each wavelength and output as spectrum data.

However, in JP-A-2014-153066, the spectrum data indicating a color of the colorimetric region is output as the measurement result, but intermediate data is not output. That is, a measured value of each pixel in the colorimetric region and spectrum data of each pixel are not output, and a user cannot determine whether or not the output spectrum data is correct.

SUMMARY

An image analysis apparatus according to a first aspect of the present disclosure includes one or more processors configured to execute (a) acquiring, from a measurement device, spectral images for a plurality of wavelengths, obtained by imaging a measurement target, (b) acquiring a target range in each of the spectral images, (c) performing multivariate analysis of each pixel based on a gradation value of the pixel for each wavelength in the target range, (d) generating an analysis image including an analysis result of the multivariate analysis for each pixel in the target range, and (e) storing the generated analysis image into a memory.

An image analysis method according to a second aspect of the present disclosure includes causing one or more processors to analyze spectral images for a plurality of wavelengths, obtained by imaging a measurement target, in which the one or more processors function as a spectral image acquisition section, a range acquisition section, an analysis section, and an analysis image generation section, the spectral image acquisition section executes a spectral image acquisition step of acquiring the spectral images for the plurality of wavelengths, obtained by imaging the measurement target, the range acquisition section executes a range acquisition step of acquiring a target range in each of the spectral images, an analysis section executes an analysis step of performing multivariate analysis of each pixel based on a gradation value of the pixel for each wavelength in the target range, and an analysis image generation section executes an analysis image generation step of generating an analysis image including an analysis result of the multivariate analysis for each pixel in the target range.

A non-transitory computer-readable storage medium according to a third aspect of the present disclosure stores an image analysis program that can be read and executed by a computer and causes the computer to function as the above image analysis apparatus.

DESCRIPTION OF EXEMPLARY EMBODIMENTS

Hereinafter, an embodiment according to the present disclosure will be described.

Figure 1:
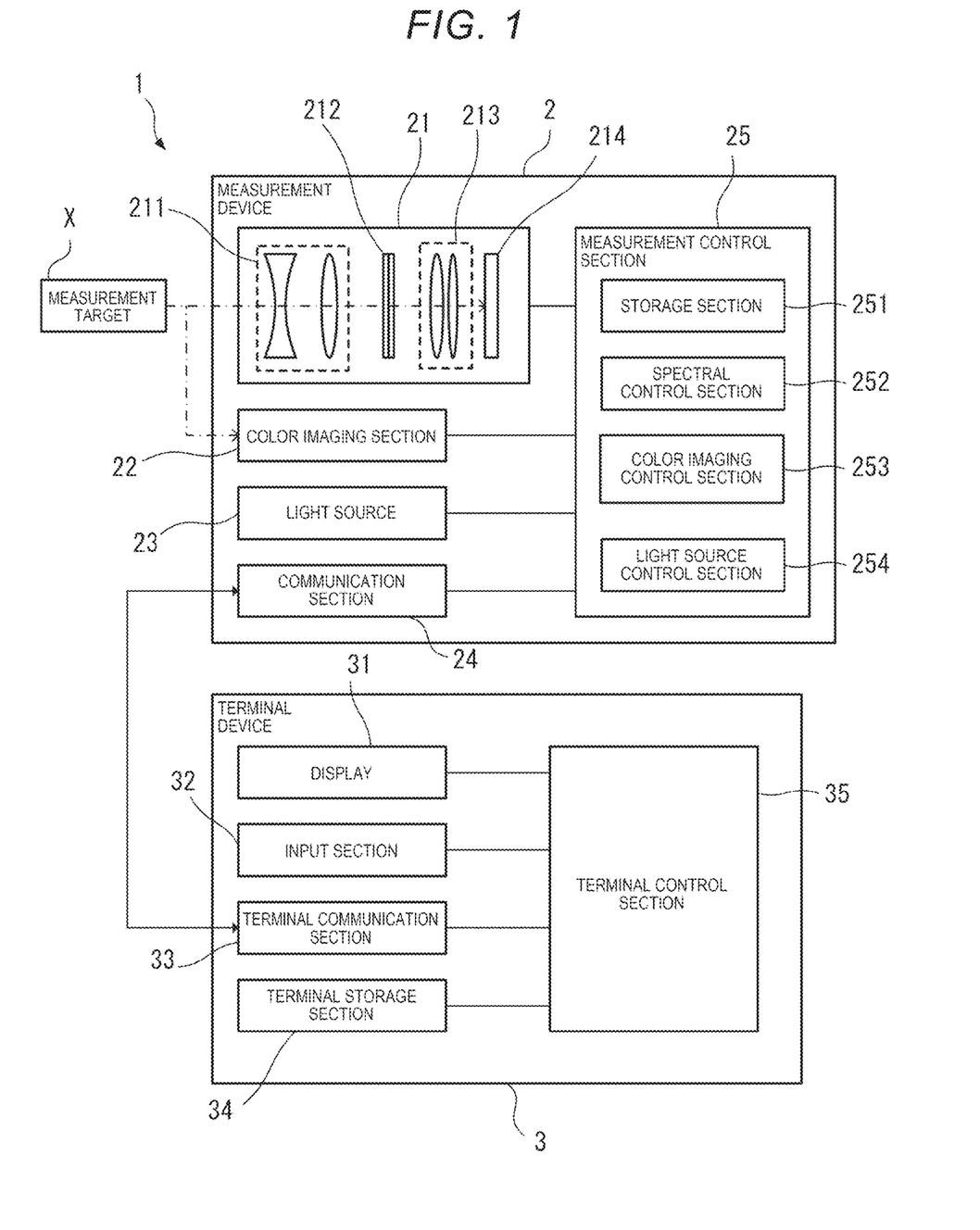
FIG. 1 is a block diagram illustrating a schematic configuration of an analysis system according to an embodiment of the present disclosure.

FIG. 1 is a block diagram illustrating a schematic configuration of an analysis system 1 of the present embodiment.

The analysis system 1 includes a measurement device 2 and a terminal device 3, which are configured to be able to communicate with each other, and configure an image analysis apparatus according to the present disclosure.

In the analysis system 1, the measurement device 2 images measurement target light (incident light) from a measurement target X and outputs a captured image to the terminal device 3. Consequently, a color image of the measurement target X is displayed on a display 31 (display section) coupled to the terminal device 3. The user operates the terminal device 3 to designate a range in which the measurement is to be performed in the color image displayed on the display 31, and the terminal device 3 sets the designated range as the target range. The measurement device 2 captures spectral images of the measurement target X for a plurality of wavelengths. The terminal device 3 performs image analysis of a target range based on the captured spectral images for the plurality of wavelengths, and outputs an analysis result and features in the target range obtained through the analysis result to the display 31.

Here, the image analysis in the present disclosure is a process of analyzing a component of each pixel based on a gradation value of each pixel of a plurality of spectral images. The component to be analyzed is an index value when a feature of the measurement target X is determined, and differs depending on a feature to be determined. For example, when a color feature in a target range of the measurement target X is determined, an index value of a color component of each pixel in the target range is analyzed. As index values of color components, color system parameters such as RGB values, L*a*b* values, and xyz values may be exemplified. When a material of the measurement target X is determined as a feature, a component included in the target range of the measurement target X is analyzed as an index value. For example, when an ingredient used for a dish or the like is determined as a feature, each nutrient or a water content included in the target range is analyzed as an index value.

When a color is determined as in the former case, spectral images for a plurality of spectral wavelengths in a visible light region may be acquired as a plurality of spectral images, and, when a material or a physical property of an object is determined, spectral images for a plurality of spectral wavelengths in an ultraviolet region or an infrared region are acquired.

In the present embodiment, as an example, the analysis system 1 performs an analysis process for determining a color of a measurement target, and each configuration will be described in detail below.

Structure of Measurement Device 2

As illustrated in FIG. 1, the measurement device 2 includes a spectral imaging section 21, a color imaging section 22, a light source 23, a communication section 24, and a measurement control section 25.

The spectral imaging section 21 captures a spectral image of measurement target light from the measurement target X. The spectral imaging section 21 includes an incident optical system 211, a spectral element 212, an image formation optical system 213, and an imaging element 214.

The incident optical system 211 guides measurement light from the measurement target X to the spectral element 212. The incident optical system 211 is configured with, for example, a plurality of lenses forming an image-side telecentric optical system, and converts main rays of the measurement light into parallel rays to be incident to the spectral element 212.

The spectral element 212 disperses light having a predetermined wavelength from the measurement light and emits the light toward the imaging element 214. The spectral element 212 is not particularly limited as long as the spectral element disperses light having a predetermined wavelength and can change a wavelength of light to be dispersed (spectral wavelength). For example, in the present embodiment, a Fabry-Perot etalon is used as the spectral element 212. The Fabry-Perot etalon is an element including a pair of reflective films facing each other and a gap changing portion that changes a size of a gap between the reflective films. In such a Fabry-Perot etalon, a size of the gap between the pair of reflective films is changed by the gap changing portion, and thus it is possible to transmit light having a wavelength corresponding to the gap from the measurement light.

As the spectral element 212, an acousto-optic tunable filter (AOTF), a liquid crystal tunable filter (LCTF), or the like may be used.

The image formation optical system 213 is configured with, for example, a plurality of lenses, and forms an image of light having a spectral wavelength transmitted through the spectral element 212 on the imaging element 214.

The imaging element 214 is configured with, for example, a complementary metal-oxide semiconductor (CMOS) sensor or a charge-coupled device (CCD) sensor, and receives light having a predetermined spectral wavelength that has transmitted through the incident optical system 211, the spectral element 212, and the image formation optical system 213, and outputs a spectral image.

The color imaging section 22 is a normal RGB camera that captures a color image of the measurement target X.

That is, although not illustrated, the color imaging section 22 includes an incident optical system to which the measurement light is incident, an image formation optical system that forms an image of the measurement light on an imaging element configured with a CCD, CMOS, or the like, and an imaging element, and, for example, RGB color filters arranged in a Bayer arrangement are arranged in the imaging element. Consequently, the color imaging section 22 captures a color image including a gradation value of each color of red (R), green (G), and blue (B) as a pixel value.

In the present embodiment, an example in which the color imaging section 22 is provided is described, but the present disclosure is not limited to this. For example, the spectral imaging section 21 captures a spectral image for one wavelength (for example, 680 nm) in the red wavelength region, a spectral image for one wavelength (for example, 550 nm) in the green wavelength region, and a spectral image for one wavelength (for example, 400 nm) in the blue wavelength region. A color image may be synthesized by combining these three spectral images. When such a synthesized image is used, the constituents of the color imaging section 22 can be eliminated.

The light source 23 emits light toward the measurement target X, and the measurement device 2 measures image light reflected by the measurement target X as the measurement light, that is, captures an image thereof.

The light source 23 emits uniform light with respect to the wavelength region of the spectral image captured by the spectral imaging section 21. For example, the analysis system 1 of the present embodiment analyzes a color of the measurement target X. In this case, the spectral imaging section 21 switches wavelengths of light dispersed by the spectral element 212 at predetermined wavelength intervals in the visible light region of, for example, 400 nm to 700 nm, and captures a spectral image for each wavelength. Therefore, as the light source 23, a white light source in which an amount of light at each wavelength in the visible light region is substantially uniform may be used. When an analysis process using the near-infrared region is performed in the analysis system 1, it is necessary to capture a spectral image for each wavelength in the near-infrared region, and thus a light source having a substantially uniform amount of light for each wavelength in the near-infrared region may be used as the light source 23.

The communication section 24 performs communication with the terminal device 3 or other external devices. A communication method of the communication section 24 is not particularly limited, and, for example, wired communication may be used, or wireless communication using a wireless LAN or the like may be used.

The measurement control section 25 has various functions for controlling the measurement device 2. Specifically, the measurement control section 25 functions as a storage section 251, a spectral control section 252, a color imaging control section 253, and a light source control section 254. Each of these functional constituents is configured with a combination of an arithmetic circuit such as a CPU that functions as a processor provided on a circuit board, a storage circuit such as a memory, and various driver circuits. The processor in the present disclosure is a term that includes a CPU configured to execute a software program and a hardware circuit.

The storage section 251 stores various programs and various data for controlling the measurement device 2. For example, as the various data, for example, a drive table for controlling the spectral element 212 is recorded. As described above, when the Fabry-Perot etalon is used as the spectral element 212 and the gap between the pair of reflective films is controlled by an electrostatic actuator, a relationship between a spectral wavelength and a value of a voltage applied to the electrostatic actuator is recorded on the drive table. As the various data, information regarding a measurement wavelength when measuring the measurement target X, for example, a measurement start wavelength, a wavelength change interval, and a measurement end wavelength may be recorded. The storage section 251 records a spectral image or a color image captured by the spectral imaging section 21 or the color imaging section 22.

The spectral control section 252 controls the spectral element 212 based on the drive table stored in the storage section 251 to disperse light having a desired spectral wavelength from the spectral element 212. The spectral control section 252 controls the imaging element 214 of the spectral imaging section 21 to capture a spectral image.

The color imaging control section 253 controls the color imaging section 22 to capture a color image.

The light source control section 254 controls turning on and off of the light source 23, for example, based on a user's instruction.

Configuration of Terminal Device 3

As illustrated in FIG. 1, the terminal device 3 is a computer including a display 31, an input section 32, a terminal communication section 33, a terminal storage section 34, and a terminal control section 35 as a hardware configuration. The terminal storage section 34 is a solid state drive as a storage device. The terminal control section 35 has a CPU and a GPU as a processor, and a DRAM as a memory accessed from the processor. In the following disclosure, the storage device included in the terminal storage section 34 and the memory included in the processor may be referred to as "memory" without particular distinction.

The display 31 is a display section according to the present disclosure, and various display devices such as a liquid crystal display and an organic EL display may be used. In the present embodiment, an example in which the terminal device 3 includes the display 31 is described, but the display 31 may be configured separately from the terminal device 3 and coupled to the terminal device 3 in a communicable manner.

The input section 32 receives an operation from the user and outputs an operation signal corresponding to the operation to the terminal control section 35. The input section 32 may be a touch panel integrally formed with the display 31, or various input devices such as a mouse and a keyboard may be used.

The terminal communication section 33 is a terminal communication interface and communicates with the measurement device 2 or other external devices. A communication method of the terminal communication section 33 is not particularly limited, and may be wired communication or wireless communication.

The terminal storage section 34 records various data and various programs used in a calculation process executed by the terminal control section 35. Specifically, the terminal storage section 34 stores spectral images or color images for a plurality of spectral wavelengths obtained from the measurement device 2, an analysis image generated through the analysis process, an image analysis program for controlling the analysis system 1, and the like.

The terminal control section 35 executes various functions by reading and executing various programs recorded in the terminal storage section 34, and controls the terminal device 3 and the analysis system 1.

Figure 2:
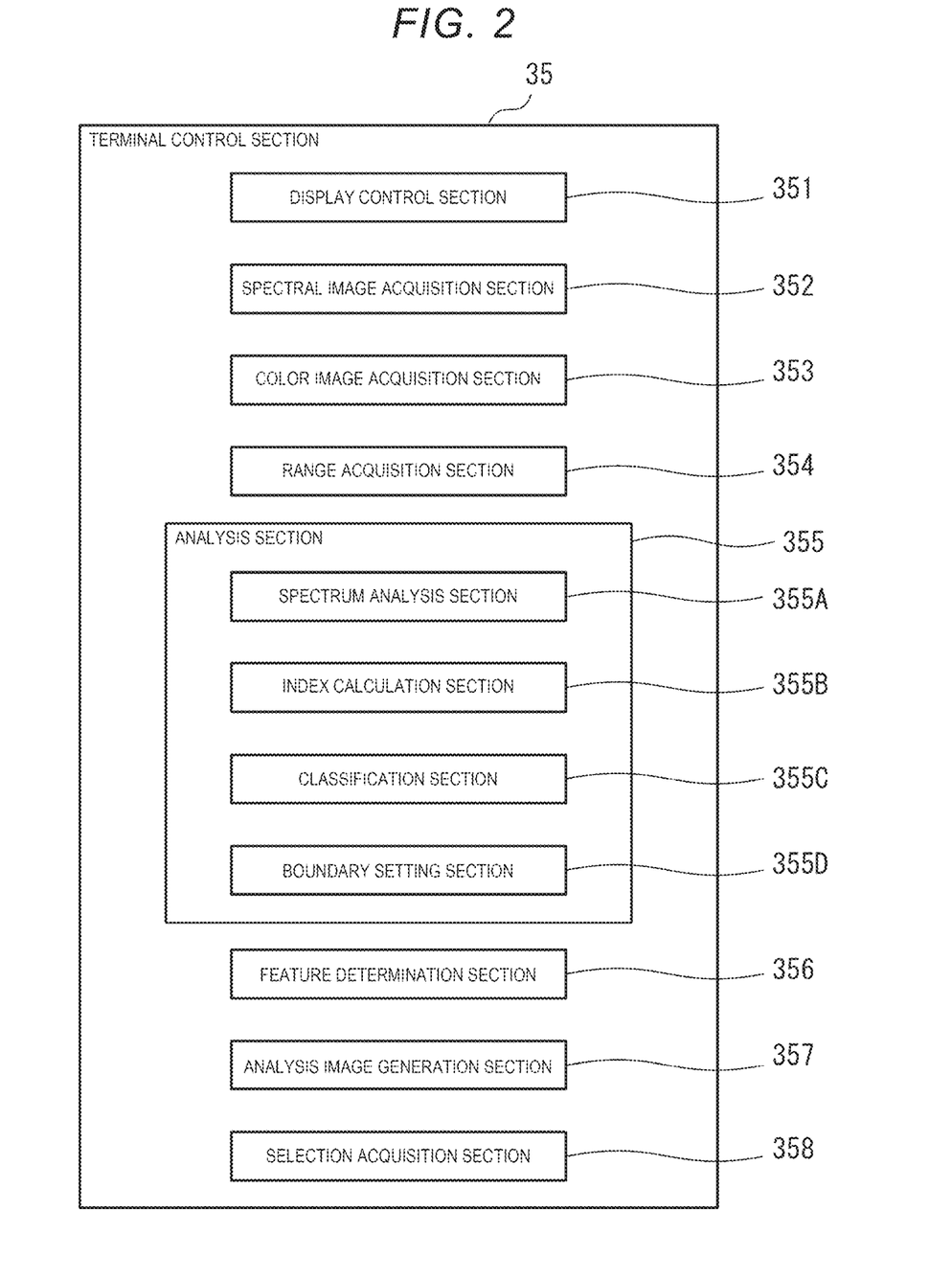
FIG. 2 is a diagram illustrating a functional configuration of a terminal control section of the present embodiment.

FIG. 2 is a diagram illustrating a functional configuration of the terminal control section 35.

The terminal control section 35 reads and executes the image analysis program recorded in the terminal storage section 34, and thus functions as a display control section 351, a spectral image acquisition section 352, a color image acquisition section 353, a range acquisition section 354, an analysis section 355, a feature determination section 356, an analysis image generation section 357, a selection acquisition section 358, and the like as illustrated in FIG. 2.

The display control section 351 controls image display on the display 31. Examples of the image to be displayed on the display 31 include a color image captured by the color imaging section 22 of the measurement device 2, an analysis image generated by the analysis image generation section 357, and an image of a feature of the measurement target X determined by the feature determination section 356. In addition, an operation screen for operating the analysis system 1, notification information for notifying a user of an operating status of the measurement device 2, and the like may be displayed.

The spectral image acquisition section 352 outputs a command for imaging a spectral image to the measurement device 2. Consequently, the spectral imaging section 21 of the measurement device 2 captures spectral images for a plurality of spectral wavelengths and outputs the spectral images to the terminal device 3. The spectral image acquisition section 352 acquires the spectral images output from the measurement device 2 and stores the spectral images into the terminal storage section 34.

The color image acquisition section 353 outputs a command for imaging a color image to the measurement device 2. Consequently, the color imaging section 22 of the measurement device 2 captures color images of the measurement target X and outputs the color images to the terminal device 3. The color image acquisition section 353 acquires the spectral images output from the measurement device 2. In the present embodiment, the acquired color images are displayed on the display 31 as real-time images by the display control section 351. That is, the color imaging section 22 continuously captures images of the measurement target X at a predetermined sampling frequency until a stop command is input by the user, and updates the real-time images displayed on the display 31.

The range acquisition section 354 acquires a range (target range) for analyzing the measurement target X. Specifically, the user designates a desired target range for a color image of the measurement target X displayed on the display 31, and thus the range acquisition section 354 acquires a target range of a spectral image corresponding to the color image. The target range may be designated, for example, in a predetermined range centered on a point specified by the user, or may be a range freely set by the user, for example, by a drag operation.

The analysis section 355 specifies the target range acquired by the range acquisition section 354 in the spectral images for a plurality of spectral wavelengths, and performs an analysis process based on gradation values of pixels in the target range of each spectral image.

Specifically, the analysis section 355 functions as a spectrum analysis section 355A, an index calculation section 355B, a classification section 355C, and a boundary setting section 355D.

The spectrum analysis section 355A calculates a spectral spectrum for each pixel based on the gradation value of each pixel in the target range of a spectral image.

The index calculation section 355B analyzes an index value for determining a feature in the target range of the measurement target X based on the calculated spectral spectrum. Specifically, the index calculation section 355B calculates the index value for each pixel. As described above, since the spectral spectrum for each pixel, that is, the gradation value for each spectral wavelength is obtained, the index calculation section 355B performs a multivariate analysis process with the gradation value for each of these spectral wavelengths as a variable. The multivariate analysis process is not particularly limited, and for example, various analysis methods such as principal component analysis and correspondence analysis may be used. An analysis method may be designated by the user.

When the measurement device 2 measures spectral images for 16-band spectral wavelengths, sixteen gradation values are acquired as variable parameters for each pixel. The spectrum analysis section 355A and the index calculation section 355B perform multivariate analysis on the sixteen variable parameters to calculate the spectral spectrum and the index value.

The classification section 355C associates pieces of pixel analysis data having similar index values in the target range and classifies the data as the same group. As the group classification, for example, each piece of pixel analysis data may be classified according to the number of classifications designated by the user, or analysis results from the index calculation section 355B may be clustered such that the pixel analysis data is automatically classified into a predetermined number of groups.

The boundary setting section 355D sets a boundary between the groups classified by the classification section 355C. As will be described later in detail, in the present embodiment, an analysis image in a three-axis coordinate system with each index value as an axis is generated based on three index values. The boundary setting section 355D sets a boundary for separating each group when points corresponding to the pixel analysis data are plotted on the three-axis coordinate system of the analysis image. The boundary may be a plane or a curved surface.

The feature determination section 356 determines a feature of the measurement target X in a pixel corresponding to the pixel analysis data in the target range based on the index value of each piece of pixel analysis data. For example, in the present embodiment, a color of each pixel in the target range is determined.

The feature determination section 356 may determine a feature of the entire target range. That is, the number of pixels included in the pixel group having the same feature is counted based on the feature of each pixel included in the target range, and a feature of a pixel group having the largest number of pixels is determined as a feature of the target range. The pixel group having the same feature may be a group of pixels classified as the same group by the classification section.

The analysis image generation section 357 generates an analysis image in which each piece of pixel analysis data obtained through multivariate analysis performed by the analysis section 355 is plotted on the three-axis coordinate system. In this case, the analysis image generation section 357 may represent the feature specified by the feature determination section 356 in the analysis image. For example, when the feature determination section 356 determines "red", each plot point is displayed as a red point, and when the feature determination section 356 determines "blue", each plot point is displayed as a blue point.

When a predetermined plot point is selected by the user in the analysis image displayed on the display 31, the selection acquisition section 358 acquires the plot point.

Operation of Analysis System

Figure 3:
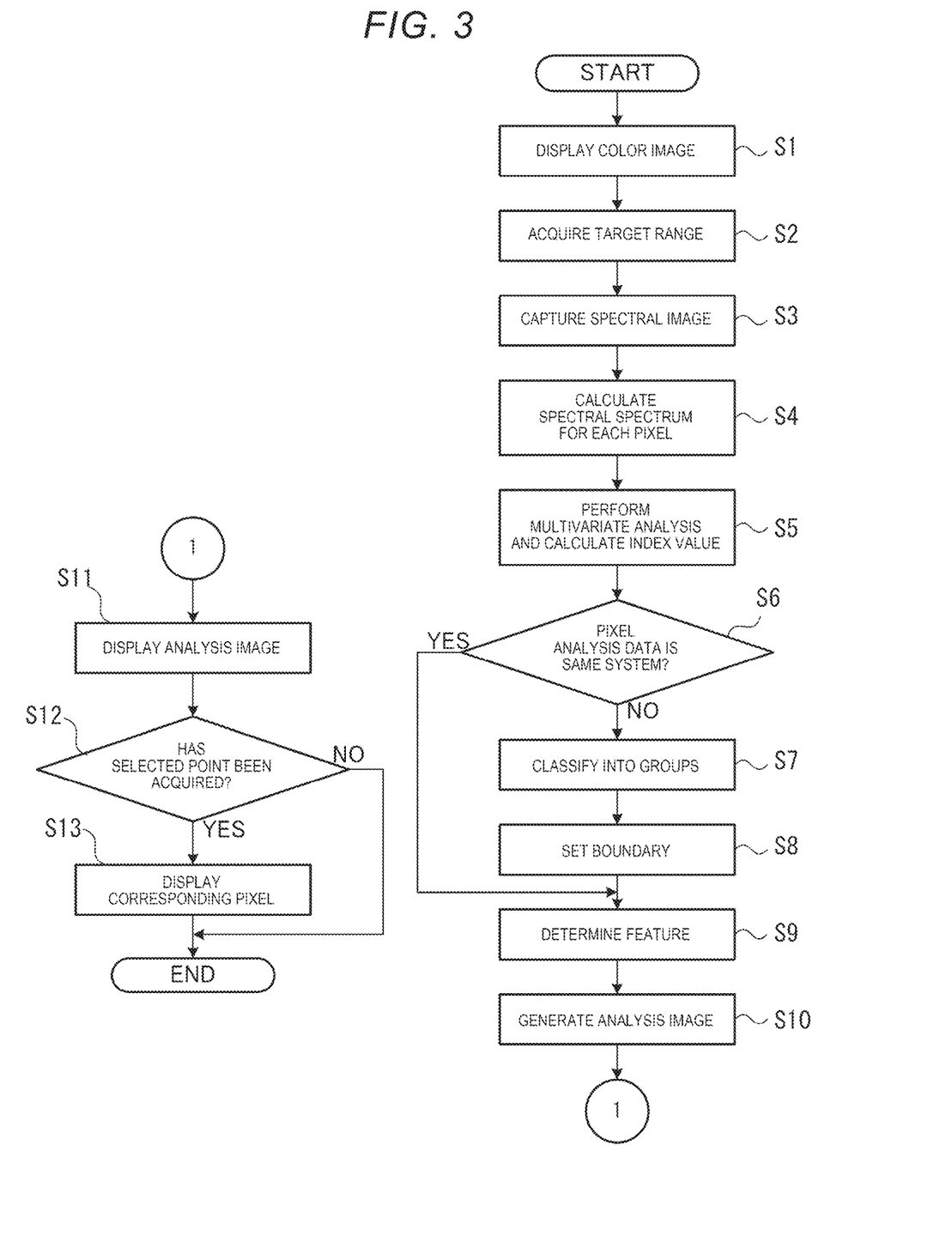
FIG. 3 is a flowchart illustrating an image analysis method in the analysis system of the present embodiment.

FIG. 3 is a flowchart illustrating an image analysis method in the analysis system 1 of the present embodiment.

In the analysis system 1 of the present embodiment, in image analysis for the measurement target X, first, a user performs an input operation for capturing an image of the measurement target X desired to be measured. Consequently, the terminal device 3 outputs a command signal for giving a command for a color image capturing process to the measurement device 2.

Consequently, the color imaging section 22 of the measurement device 2 captures a color image of the measurement target X and outputs the captured color image to the terminal device 3. When the color image is captured by the measurement device 2, the terminal device 3 displays the color image on the display 31 (step S1). In the present embodiment, an example in which a color image is captured by the color imaging section 22 provided in the measurement device 2 is described, but a color image may be generated by combining spectral images captured by the spectral imaging section 21.

The terminal device 3 causes the display 31 to display guidance information to the effect that the target range is designated. When the user performs an input operation for designating a target range for the color image, the range acquisition section 354 acquires the designated and input target range in the color image (step S2: range acquisition step). As described above, the target range may be a range within a predetermined distance to a point designated by the user, or may be a range designated by the user through a drag operation or the like. A plurality of target ranges may be designated.

Thereafter, the terminal device 3 outputs a spectral imaging command for performing a spectral imaging process to the measurement device 2. Consequently, the spectral imaging section 21 of the measurement device 2 captures a spectral image for a preset spectral wavelength with respect to a predetermined measurement wavelength region (step S3: spectral image acquisition step). For example, in the present embodiment, in order to determine a color of the measurement target X, 16-band spectral images at intervals of 20 nm are captured with the visible light region of 700 nm to 400 nm as the measurement wavelength region.

Specifically, the spectral control section 252 of the measurement control section 25 that has received the spectral imaging command reads the drive table from the storage section 251 and sequentially applies a drive voltage corresponding to each wavelength at intervals of 20 nm from 700 nm to 400 nm to the gap changing portion of the spectral element 212. Consequently, image light having each spectral wavelength at intervals of 20 nm from 700 nm to 400 nm, transmitted through the spectral element 212, is sequentially imaged by the imaging element 214.

In step S3, a spectral image corresponding to the entire color image captured in step S1 may be captured, and only a spectral image of the target range designated in step S2 in the color image captured in step S1 may be captured. When a spectral image of the target range is captured, it is possible to suppress the pressure on the capacity of the terminal storage section 34 and to quickly capture the spectral image.

Thereafter, when the terminal device 3 receives the spectral image for each spectral wavelength from the measurement device 2, the analysis section 355 performs an analysis step.

Specifically, the spectrum analysis section 355A calculates a spectral spectrum for each pixel, that is, the light intensity for each spectral wavelength, based on a gradation value of each pixel in the target range of each spectral image (step S4).

The index calculation section 355B performs a multivariate analysis process based on the calculated spectral spectrum, and thus calculates an index value or a feature vector (step S5). Depending on processes, a parameter group required for the multivariate analysis process may be determined in advance based on a plurality of known spectral images.

As described above, the index value may be selected according to an analysis target item of the measurement target X. For example, in the present embodiment, RGB values are calculated as index values in order to determine a color of the target range. Here, RGB values are exemplified as index values used for color determination, but xyz values or L*a*b* values may be used. In the present embodiment, color determination is exemplified, but, as described above, when a feature such as a material or a physical property of the measurement target X is determined, composition amounts of various components contained in the measurement target X, for example, each component amount of a first component, a second component, and a third component may be analyzed as an index value.

These index values are calculated for each of the pixels in the target range and recorded in the terminal storage section 34 as pixel analysis data. For example, when a pixel A and a pixel B are included in the target range, and $r=r_A$, $g=g_A$, and $b=b_A$ are calculated as RGB values that are index values for color determination with respect to the pixel A, and $r=r_B$, $g=g_B$, and $b=b_B$ are calculated for the pixel B, pixel analysis data $D_A$ ($r_A$, $g_A$, $b_A$) for the pixel A and pixel analysis data $D_B$ ($r_B$, $g_B$, $b_B$) for the pixel B are calculated and are stored in the terminal storage section 34 in association with position information indicating pixel positions.

Next, the classification section 355C of the analysis section 355 determines whether or not the pixel analysis data or the feature vector of each pixel in the target range is classified as the same system (step S6). That is, it is determined whether or not the target range is a range including a configuration having the same feature. For example, in the present embodiment, it is determined whether or not the target range has the same system color.

When NO is determined in step S6, the classification section 355C classifies the pixel analysis data into a plurality of groups (step S7).

For example, in the present embodiment, the pixel analysis data is classified into a plurality of color groups of the same system color such as a red system, a blue system, and a green system. In this case, the classification section 355C calculates, for example, a distance (for example, a Mahalanobis distance or a Euclidean distance) of the pixel analysis data of each pixel from color reference data, and sets a plurality of pieces of pixel analysis data having the farthest distance as reference data. For each piece of the pixel analysis data, reference data having the smallest distance is specified among the pieces of reference data, and the pixel analysis data is classified as a group of the specified reference data.

The reference data may be set in advance. For example, in the present embodiment, red reference data for red, green reference data for green, and blue reference data for blue may be set, and each piece of the pixel analysis data may be classified based on a distance from the reference data to the pixel analysis data.

Thereafter, the boundary setting section 355D sets the boundary in each of the classified groups (step S8). For example, the boundary setting section 355D forms a boundary surface that passes through a midpoint of a line segment connecting pixel analysis data in each group to pixel analysis data having the closest distance in another group and separates the groups from each other. The boundary surface may be a plane perpendicular to the line segment passing through the midpoint, or may be a curved surface passing through the midpoint.

After step S8 and when YES is determined in step S6, the feature determination section 356 determines a feature in the target range based on each piece of the pixel analysis data (step S9).

When YES is determined in step S6, that is, when all the pixel analysis data in the target range are within a predetermined distance and are not classified into groups, a feature in the target range of the measurement target is determined based on an average of pixel feature data or a representative value (for example, reference data) of the pixel feature data.

When NO is determined in step S6, the pixel analysis data is classified into a plurality of groups through step S7 and step S8. In this case, the feature determination section 356 determines a feature for each group based on the pixel feature data of each group. For example, a feature for a group is determined based on an average of the pixel analysis data belonging to the group or a representative value (for example, reference data) of the pixel analysis data belonging to the group.

Thereafter, the analysis image generation section 357 generates an analysis image in which each piece of pixel feature data is plotted on the three-axis coordinate system based on the analyzed index value (step S10: analysis image generation step).

Figure 4:
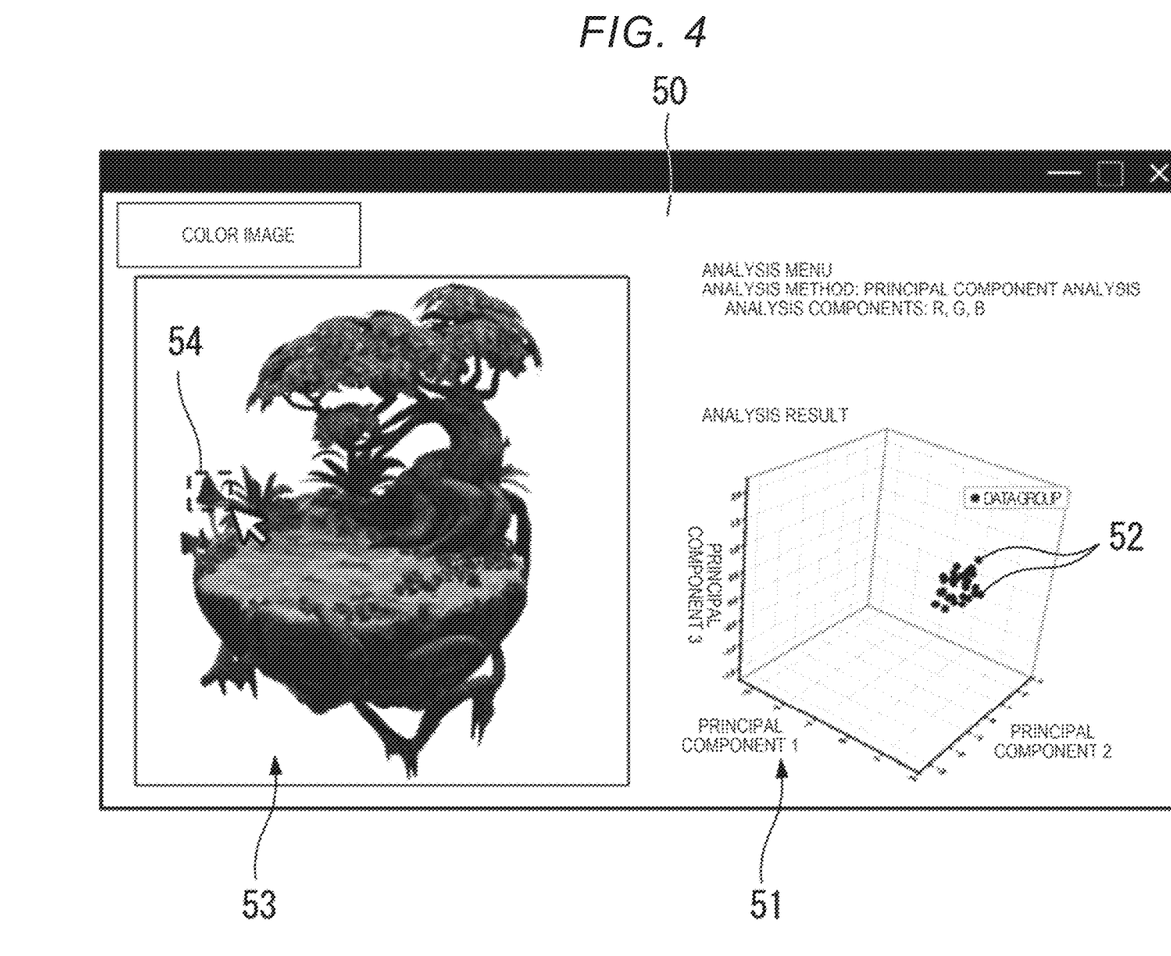
FIG. 4 is a diagram illustrating an example of an analysis image of the present embodiment.
Figure 5:
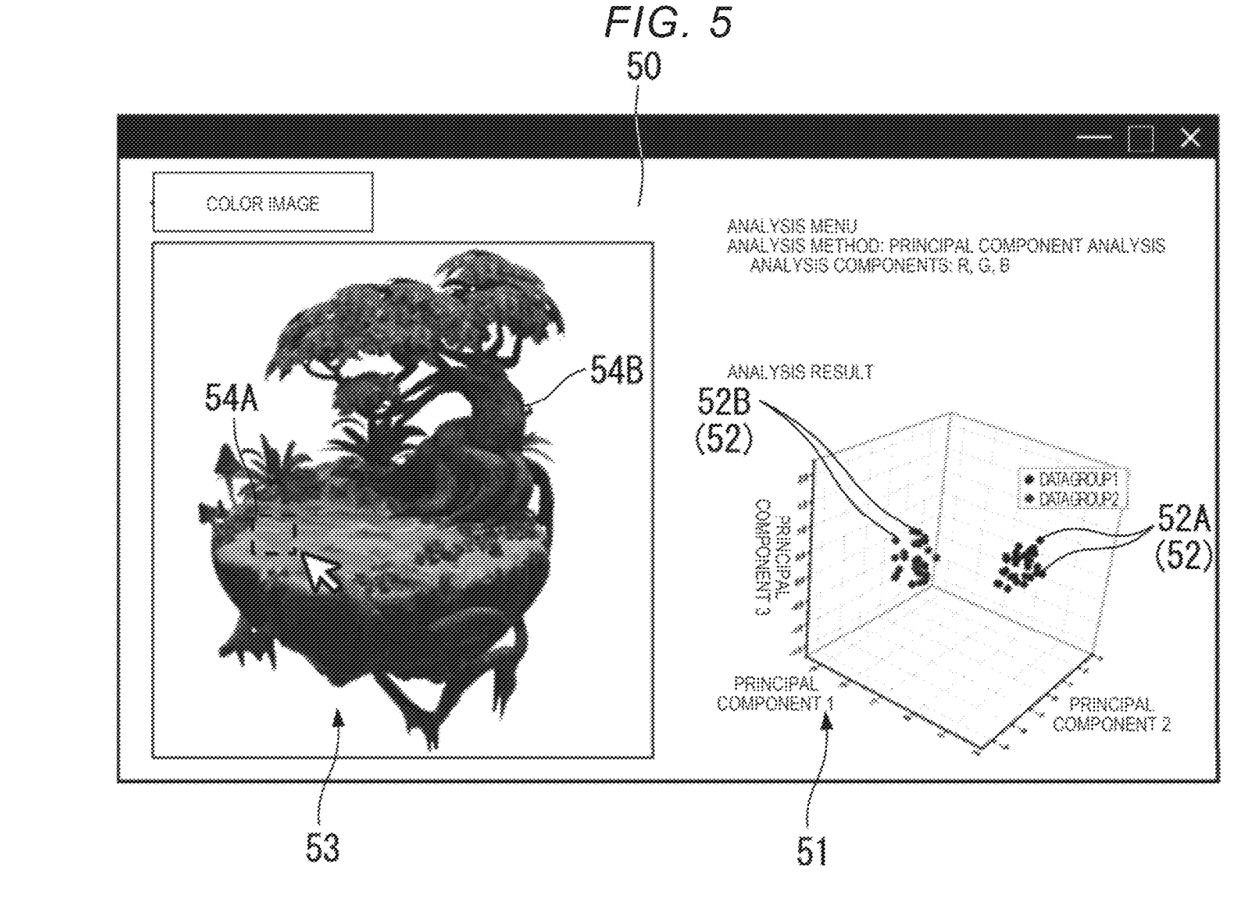
FIG. 5 is a diagram illustrating another example of the analysis image of the present embodiment.
Figure 6:
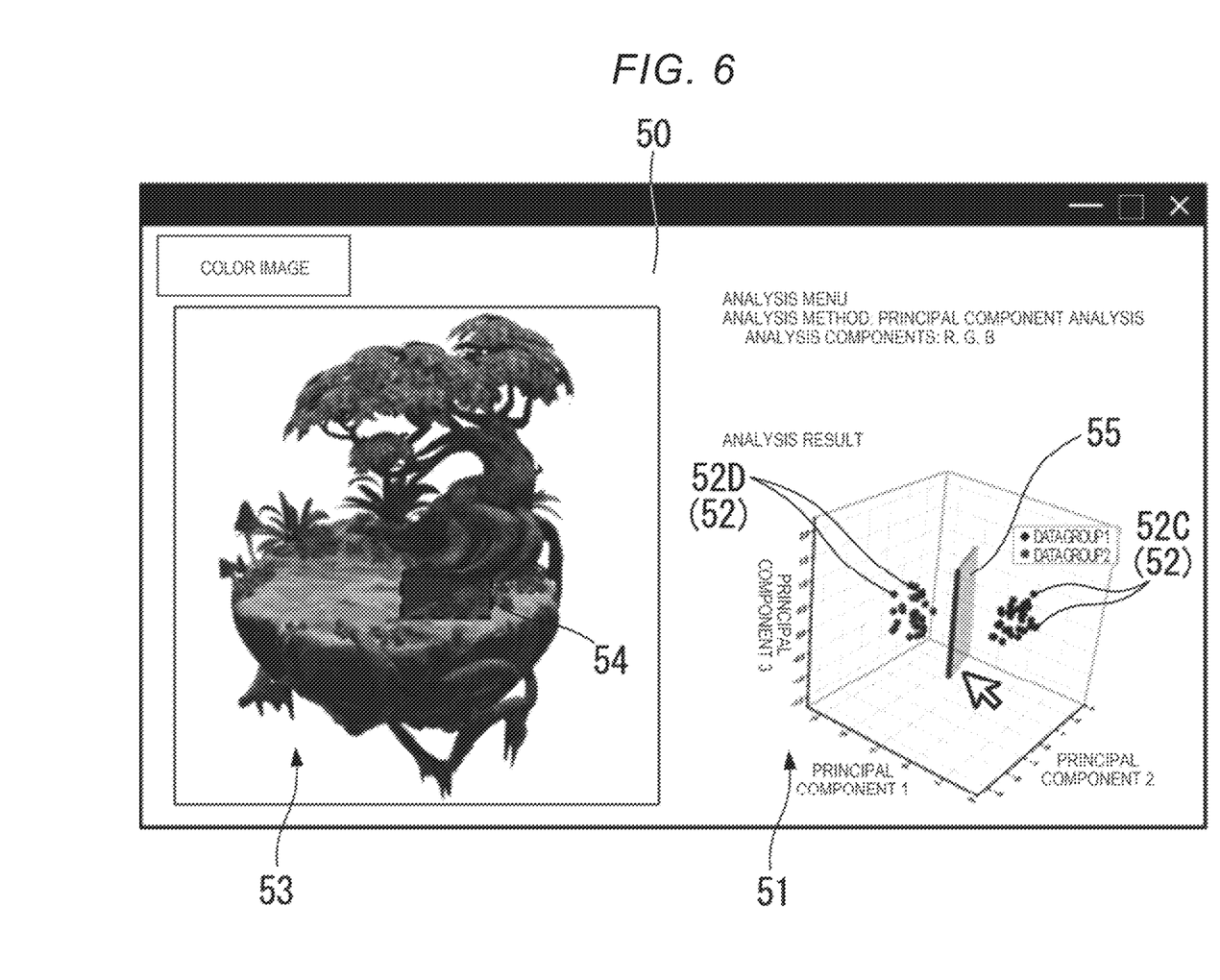
FIG. 6 is a diagram illustrating still another example of the analysis image of the present embodiment.

FIGS. 4 to 6 are diagrams illustrating examples of analysis images.

FIG. 4 illustrates an analysis image when a single target range is designated in step S2 and each piece of pixel analysis data in the target range is not classified as a group.

FIG. 5 illustrates an analysis image when two target ranges are designated in step S2 and each piece of pixel analysis data in the target range is not classified as a group.

FIG. 6 illustrates an analysis image when a single target range is designated in step S2 and each piece of pixel analysis data in the target range is not classified into two groups.

As illustrated in FIGS. 4 and 6, when there is a single target range, the analysis image generation section 357 generates an analysis image 50 displaying plot points 52 in which pixel analysis data as a result of multivariate analysis is plotted on a three-axis coordinate system graph 51 with each index value as an axis.

For example, in the present embodiment, R, G, and B are analyzed from a spectral spectrum by using principal component analysis. In this case, as illustrated in FIG. 4, each piece of pixel analysis data is plotted on the three-axis coordinate system graph 51 with R, G, and B as axes. As illustrated in FIGS. 4 to 6, the analysis image 50 may display an analysis method or analysis components obtained through the analysis.

When a material or a physical property of the measurement target X is determined as a feature, four or more index values may be calculated. For example, when an ingredient contained in a dish is determined, a plurality of component amounts such as water, sugar, lipid, protein, and iron are calculated as index values. In this case, for example, a three-axis coordinate system may be generated based on three index values designated by a user, and a total for each component amount included in the target range may be calculated, and the top three components with the largest total may be specified as index values represented in the three-axis coordinate system.

The analysis image generation section 357 may generate the analysis image 50 in which a color image 53 captured in step S1 is also displayed. In this case, the target range 54 designated by the user is superimposed on the color image 53. The analysis image generation section 357 displays the features determined by the feature determination section 356 in the analysis image 50. For example, in the present embodiment, the plot points 52 of the pixel analysis data are displayed according to the color of the measurement target X determined by the feature determination section 356. Consequently, the user can recognize the color of the target range 54 of the measurement target X with the plot points 52 on the three-axis coordinate system graph 51. The determination result in the feature determination section 356 may be superimposed and displayed on the target range 54 of the color image 53.

When a plurality of target ranges 54 are designated in step S2, the analysis image generation section 357 displays target ranges 54A and 54B designated by the user in the color image 53 as illustrated in FIG. 5. Here, one target range 54 will be referred to as a first target range 54A, and the other target range will be referred to as a second target range 54B.

The analysis image generation section 357 displays, on the three-axis coordinate system graph 51, first plot points 52A of first pixel analysis data corresponding to the first target range 54A and second plot points 52B of second pixel analysis data corresponding to the second target range 54B. In this case, the first plot points 52A and the second plot points 52B may have different display forms. For example, the first plot point 52A is displayed as a "round" point and the second plot point 52B is displayed as a "square" point. When a feature determination result using the first pixel analysis data and a feature determination result using the second pixel analysis data in the feature determination section 356 are different from each other, the first plot point 52A and the second plot point 52B may be displayed according to the respective features. For example, when the first target range 54A is determined as being red and the second target range 54B is determined as being blue, the first plot point 52A may be displayed red and the second plot point 52B may be displayed blue. In this case, each plot point and a corresponding target range may be displayed, for example, the first target range 54A is displayed in the same color frame as that of the first plot point 52A, the second target range 54B is displayed in the same color frame as that of the second plot point 52B.

In step S2, when the single target range 54 is designated and pixel analysis data belonging to the target range is classified into a plurality of groups, the analysis image generation section 357 displays the plot points 52 corresponding to the respective groups on the three-axis coordinate system graph in different display forms as illustrated in FIG. 6. For example, the example illustrated in FIG. 6 is an example in which the pixel analysis data is classified into two groups, and third plot points 52C belonging to one group and fourth plot points 52D belonging to the other group are displayed. The analysis image generation section 357 displays a boundary image 55 set by the boundary setting section 355D on the three-axis coordinate system graph 51.

The analysis image generation section 357 may clearly indicate the target range 54 of the color image 53 such that the pixels corresponding to the third plot point 52C and the pixels corresponding to the fourth plot point 52D are displayed in different display forms. For example, in FIG. 6, when the feature determination section 356 determines that a color feature is red for the group of the third plot point 52C and a color feature is blue for the group of the fourth plot point 52D, each pixel is replaced with a corresponding representative color. That is, the pixels corresponding to the third plot point 52C in the target range 54 are displayed in the color image 53 in a high-brightness reddish representative color (for example, R=255, G=0, and B=0) having a predetermined value or more. Similarly, the pixels corresponding to the fourth plot point 52D in the target range 54 are displayed in a high-brightness bluish representative color (for example, R=0, G=0, and B=255) having a predetermined value or more.

After step S10, the display control section 351 displays the generated analysis image 50 as illustrated in FIGS. 4 to 6 on the display 31 (step S11).

The selection acquisition section 358 determines whether or not a predetermined plot point 52 in the three-axis coordinate system graph 51 has been selected through the user's input operation (step S12).

When YES is determined in step S12, the selection acquisition section 358 acquires the selected plot point 52 as a selected point. The display control section 351 displays a pixel corresponding to the selected point as a corresponding pixel 56 (step S13).

Figure 7:
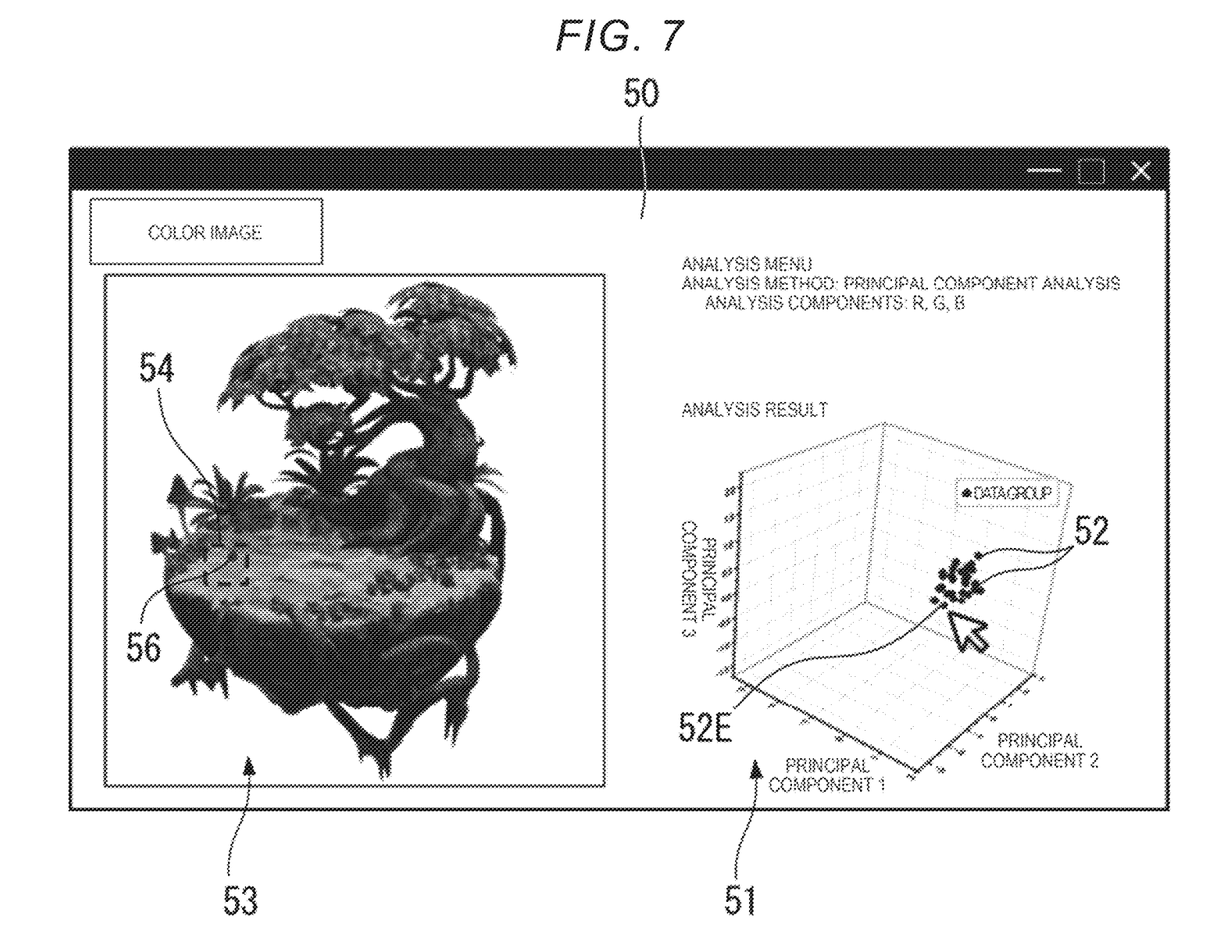
FIG. 7 is a diagram illustrating an example of an analysis image displayed on a display of the present embodiment.

FIG. 7 is a diagram illustrating an example of the analysis image 50 displayed on the display after the process in step S13. For example, when one of the plot points 52 is selected as a selected point 52E in the analysis image 50, the display control section 351 displays a pixel in the target range 54 corresponding to the selected point 52E as the corresponding pixel 56 as illustrated in FIG. 7. The corresponding pixel 56 is a pixel in which the pixel corresponding to the selected plot point is visually clearly indicated, and, for example, the corresponding pixel is blinked and displayed or is displayed at a different brightness value by a predetermined value or more relative to the surrounding pixels.

Advantageous Effects of Present Embodiment

The analysis system 1 of the present embodiment includes the measurement device 2 and the terminal device 3, and the terminal control section 35 of the terminal device 3 reads and executes the image analysis program stored in the terminal storage section 34 and thus functions as the spectral image acquisition section 352, the range acquisition section 354, the analysis section 355, and the analysis image generation section 357. The spectral image acquisition section 352 acquires spectral images for a plurality of spectral wavelengths, obtained by imaging the measurement target X. The range acquisition section 354 acquires the target range 54 in each spectral image. The analysis section 355 performs multivariate analysis of each pixel based on a gradation value for each spectral wavelength of the pixel in the target range 54. The analysis image generation section 357 generates an analysis image including the analysis result of the multivariate analysis for each pixel in the target range 54.

In such an analysis system 1, the analysis image generated by the analysis image generation section 357 is displayed, and thus not only a feature of the target range 54 but also an analysis result from which the feature determination has been performed in the target range can be displayed to the user. That is, when a feature of the measurement target X is determined, the user cannot determine whether or not the determined feature is correct simply by displaying a final feature determination result. In contrast, as in the present embodiment, the analysis image 50 as analysis result that is the intermediate data for determining a feature is displayed, and thus the user can understand the analysis result on which the determined feature is based, and can thus determine whether or not feature determination is possible.

In the present embodiment, the analysis section 355 functions as the index calculation section 355B, and calculates a plurality of index values indicating a feature of each pixel based on a gradation value for each spectral wavelength of the pixel. The analysis image generation section 357 generates the analysis image 50 in which the plot points 52 indicating an analysis result (pixel analysis data) for each pixel are plotted on the three-axis coordinate system graph 51 configured with coordinate axes corresponding to respective index values.

As described above, the index values calculated from the analysis result of the multivariate analysis are displayed on the coordinates, and thus the user can easily check the analysis result and determine the quality of the feature determination result. That is, when the plot points 52 are discrete in the three-axis coordinate system, even though the feature determination section 356 determines a feature of the target range 54, reliability thereof is low, and, conversely, when the plot points 52 are close to each other, it may be determined that the reliability of a feature determined by the feature determination section 356 is high.

In the present embodiment, the analysis section 355 functions as the classification section 355C, and further classifies each piece of pixel analysis data into a plurality of groups based on the pixel analysis data for each pixel in the target range 54. The analysis image generation section 357 displays the plot points 52 in different display forms for each of the classified groups.

Consequently, even when there are a plurality of portions having different features in the target range, groups corresponding to the respective feature can be set, and the plot points 52C and 52D are displayed in different display forms for each group as illustrated in FIG. 6. Therefore, the user checks such an analysis image 50, and can thus easily understand respective pieces of pixel analysis data corresponding to a plurality of features determined by the feature determination section 356 and properly determine the quality of each feature determination.

In the present embodiment, the analysis image generation section 357 generates the analysis image 50 displaying the boundary image 55 indicating a boundary between different groups.

That is, the analysis section 355 also functions as the boundary setting section 355D, and sets the boundary between the groups when each piece of pixel target data is classified into a plurality of groups by the classification section 355C. The analysis image generation section 357 displays the boundary image 55 corresponding to the set boundary on the three-axis coordinate system graph 51.

Consequently, the user can easily understand by what threshold value the pixel analysis data is classified when a plurality of features are determined from the target range 54.

In the present embodiment, the terminal control section 35 of the terminal device 3 functions as the feature determination section 356. The feature determination section 356 determines a feature in the target range 54 based on an analysis result of multivariate analysis in the analysis section 355. The analysis image generation section 357 generates the analysis image 50 including the analysis result in the analysis section 355 and the feature determined by the feature determination section 356. For example, in the present embodiment, the analysis image 50 including the features of the target range is obtained by displaying each plot point 52 in the color determined for the target range 54.

Consequently, the user can understand, from the analysis image 50, the plot points 52 corresponding to the pixel target data as a result of the multivariate analysis for each pixel of the target range 54 and the features of the target range determined through the multivariate analysis result.

In the present embodiment, the terminal control section 35 of the terminal device 3 also functions as the color image acquisition section 353, and the color image acquisition section 353 acquires a color image of the measurement target X. The analysis image generation section 357 generates an analysis image including the three-axis coordinate system graph 51 and the color image 53 in which the target range 54 is displayed.

Consequently, the user can easily recognize which target range 54 of the color image 53 corresponds to data of each plot point 52 on the three-axis coordinate system graph 51.

In the present embodiment, the terminal control section of the terminal device 3 functions as the display control section 351 and the selection acquisition section 358. The display control section 351 displays the analysis image 50 on the display 31. The selection acquisition section 358 acquires the selected plot point 52 as the selected point 52E when receiving the user's operation for selecting a predetermined plot point 52 for the analysis image 50 displayed on the display 31. The display control section 351 displays a pixel corresponding to the selected point 52E in the color image 53 as the corresponding pixel 56.

Consequently, the user can individually understand which pixel in the color image 53 corresponds to data of the plot point 52 displayed on the three-axis coordinate system graph 51.

MODIFICATIONS OF EMBODIMENT

The present disclosure is not limited to the above-described embodiment, and modifications, improvements, and the like within the scope in which the object of the present disclosure can be achieved are included in the present disclosure.

Modification Example 1

In the above embodiment, an example has been described in which the color imaging section 22 continuously captures a color image in a predetermined cycle and continuously updates the color image displayed on the display 31 to the captured image as a real-time image, but the present disclosure is not limited thereto.

For example, capturing of a color image in the color imaging section 22 and capturing of spectral images for a plurality of spectral wavelengths in the spectral imaging section may be simultaneously performed, and these images may be recorded in the terminal storage section 34 or the storage section 251. In this case, the user can read the image stored in the terminal storage section 34 and display the image on the display 31 at any timing, and can designate the target range 54 for the displayed color image. Since the spectral image is also captured at the time of capturing the color image, it is not necessary to capture the spectral image after the range acquisition section 354 acquires the target range 54, and the spectral image corresponding to the color image may be read from the terminal storage section 34 or the storage section 251, and the same analysis process as that in the above embodiment may be performed.

Modification Example 2

In the above embodiment, an example has been described in which, when a plurality of target ranges 54 are set by the user, the analysis image generation section 357 displays the first plot point 52A and the second plot point 52B on the three-axis coordinate system graph 51 as illustrated in FIG. 5. In this case, as illustrated in FIG. 6, the analysis image generation section 357 may display the boundary image 55 between the group of the first plot point 52A and the group of the second plot point 52B.

That is, the boundary setting section 355D may set a boundary based on each piece of first pixel analysis data belonging to the first target range 54A and each piece of second pixel analysis data belonging to the second target range 54B, and the analysis image generation section 357 may display the set boundary on the three-axis coordinate system graph 51.

Modification Example 3

In the above embodiment, the selection acquisition section 358 acquires any plot point 52 on the three-axis coordinate system graph 51 as the selected point 52E, but the present disclosure is not limited thereto. For example, the selection acquisition section 358 may acquire a pixel designated by the user as a selected point in the target range 54 of the color image 53. In this case, the display control section 351 may read pixel analysis data corresponding to the selected point from the terminal storage section 34, and display the corresponding plot point 52 in the three-axis coordinate system graph 51 as a target plot point to be visually clearly indicated.

Modification Example 4

In the above embodiment, when a plurality of target ranges 54 are designated and pixel analysis data included in each target range 54 is classified into a plurality of groups, as illustrated in FIG. 5, the plot points 52 displayed on the three-axis coordinate system graph 51 may be displayed in different display forms for the respective groups. That is, the plot points 52 may be displayed in different display forms for respective target ranges and respective groups.

Modification Example 5

In the above embodiment, the feature determination process is performed by the feature determination section 356, but the feature determination section 356 may not be provided. In this case, a feature of the measurement target X is not displayed in the analysis image 50, and the user himself/herself determines the feature of the measurement target X in the target range 54 based on an analysis result. In this case, as described above, since an analysis result for each pixel in the target range is displayed in the analysis image 50, the user can easily determine the feature in the target range.

Modification Example 6

In the above embodiment, an example has been described in which the analysis image 50 includes the three-axis coordinate system graph 51 corresponding to the three index values, but the present disclosure is not limited thereto. For example, a two-axis coordinate system graph corresponding to two index values may be included, and the analysis image 50 using a coordinate system of four or more axes may be displayed. An index value of each piece of pixel analysis data may be displayed as a numerical value in a text or table form.

An example has been described in which a color image of the measurement target X that is an imaging target is displayed as an analysis image, but the color image may not be displayed as the analysis image.

OVERVIEW OF PRESENT DISCLOSURE

An image analysis apparatus of a first aspect of the present disclosure includes a spectral image acquisition section that acquires spectral images for a plurality of wavelengths, obtained by imaging a measurement target; a range acquisition section that acquires a target range in each of the spectral images; an analysis section that performs multivariate analysis of each pixel based on a gradation value of the pixel for each wavelength in the target range; and an analysis image generation section that generates an analysis image including an analysis result of the multivariate analysis for each pixel in the target range.

Consequently, the analysis image generated by the analysis image generation section is displayed, and thus it is possible to show a user what kind of analysis result was obtained in the target range. That is, when a feature of the measurement target is determined, the user cannot determine whether or not the determined feature is correct simply by displaying a final feature determination result. In contrast, in the present aspect, since it is possible to obtain an analysis image indicating the analysis result which is intermediate data for determining the feature, the user can determine the feature of the measurement target based on the analysis result.

In the image analysis apparatus of the present aspect, the analysis section may calculate a plurality of index values indicating a feature of each pixel based on the gradation value of the pixel for each wavelength, and the analysis image generation section may generate the analysis image in which plot points indicating the analysis result for each pixel are plotted in a coordinate system configured with coordinate axes corresponding to the respective index values.

As described above, since the index values calculated from the analysis result of the multivariate analysis are displayed on the coordinates, the user can easily check the analysis result and thus easily determine a feature of the measurement target in the target range. That is, in the three-axis coordinate system, when the plot points are discrete, it may be determined that the measurement target includes various features, and conversely, when the plot points are close to each other, it may be determined that a feature of the measurement target is fixed.

In the image analysis apparatus of the present aspect, the analysis section may further classify each pixel into a plurality of groups based on the analysis result for each pixel in the target range, and the analysis image generation section may display the plot points in different display forms for the respective classified groups.

Consequently, even when there are a plurality of portions having different features in the target range, the plot points can be displayed in different display forms for the respective groups. Therefore, the user can easily understand that a plurality of features of the measurement target are included by checking such an analysis image.

In the image analysis apparatus of the present aspect, the analysis image generation section may generate the analysis image in which a boundary image indicating a boundary between the different groups is displayed.

Consequently, the user can easily understand by what threshold value pixel analysis data is classified when a plurality of features are determined from the target range.

The image analysis apparatus of the present aspect may further include a feature determination section that determines a feature in the target range based on the analysis result of the multivariate analysis, and the analysis image generation section may generate the analysis image including the analysis result and the feature.

Consequently, the user can understand, from the analysis image, the feature of the target range determined through the multivariate analysis result in addition to the result of the multivariate analysis for each pixel of the target range. Therefore, the user does not have to determine the feature of the target range by himself/herself based on the analysis result. Since the analysis result of the multivariate analysis is displayed in the analysis image, the user can check whether or not a determination result of the feature determined by the feature determination section is correct based on the analysis result.

The image analysis apparatus of the present aspect may further include a color image acquisition section that acquires a color image of the measurement target, and the analysis image generation section may generate the analysis image including the color image in which the target range is displayed.

Consequently, the user can easily recognize which target range of the color image corresponds to data of each plot point indicating an analysis result displayed in the analysis image.

In the image analysis apparatus of the present aspect, the analysis section may calculate a plurality of index values indicating a feature of each pixel based on the gradation value of the pixel for each wavelength, and the analysis image generation section may generate the analysis image in which plot points indicating the analysis result for each pixel are plotted in a coordinate system configured with coordinate axes corresponding to the respective index values, the image analysis apparatus may further include a display control section that displays the analysis image on a display section, and a selection acquisition section that, when receiving a user's operation for selecting a predetermined plot point on the analysis image displayed on the display section, acquires the selected plot point as a selected point, and the display control section may display a pixel corresponding to the selected point in the color image as a corresponding pixel.

Consequently, the user can individually understand which pixel in the color image corresponds to data of the plot point plotted on the coordinate system in the analysis image.

An image analysis method of a second aspect of the present disclosure includes causing a computer to analyze spectral images for a plurality of wavelengths, obtained by imaging a measurement target, in which the computer functions as a spectral image acquisition section, a range acquisition section, an analysis section, and an analysis image generation section, the spectral image acquisition section executes a spectral image acquisition step of acquiring the spectral images for the plurality of wavelengths, obtained by imaging the measurement target, the range acquisition section executes a range acquisition step of acquiring a target range in each of the spectral images, an analysis section executes an analysis step of performing multivariate analysis of each pixel based on a gradation value of the pixel for each wavelength in the target range, and an analysis image generation section executes an analysis image generation step of generating an analysis image including an analysis result of the multivariate analysis for each pixel in the target range.

Consequently, in the same manner as in the first aspect, the analysis image generated by the analysis image generation section is displayed, and thus it is possible to show a user what kind of analysis result was obtained in the target range.

An image analysis program of a third aspect of the present disclosure is a program that can be read and executed by a computer, and causes the computer to function as any one of the above image analysis apparatuses.

Consequently, in the same manner as in the first aspect, the analysis image generated by the analysis image generation section is displayed, and thus it is possible to show a user what kind of analysis result was obtained in the target range.

What is claimed is:

1. An image analysis apparatus, comprising:
one or more processors configured to:
acquire, from a measurement device that includes at least one sensor, spectral images for a plurality of wavelengths, obtained by imaging a measurement target;
acquire a target range in each of the spectral images, wherein the target range is acquired based on designation of a portion of a color image corresponding to the spectral images;
perform multivariate analysis of each pixel in the target range based on a gradation value of a respective pixel for each wavelength in the target range;
generate an analysis image including an analysis result of the multivariate analysis for each pixel in the target range; and
store the generated analysis image into a memory.

2. The image analysis apparatus according to claim 1, wherein the one or more processors are further configured to:
calculate a plurality of index values indicating a feature of each pixel based on the gradation value of the respective pixel for each wavelength; and
generate the analysis image in which plot points indicating the analysis result for each pixel are plotted in a coordinate system, wherein the coordinate system includes coordinate axes corresponding to respective index values of the plurality of index values.

3. The image analysis apparatus according to claim 2, wherein the one or more processors are further configured to:
classify each pixel into a plurality of groups based on the analysis result for each pixel in the target range; and
display the plot points in different display forms for respective classified groups of the plurality of groups.

4. The image analysis apparatus according to claim 3, wherein the one or more processors are further configured to generate the analysis image in which a boundary image indicating a boundary between different groups of the plurality of groups is displayed.

5. The image analysis apparatus according to claim 1, wherein the one or more processors are further configured to:
   determine a feature in the target range based on the analysis result of the multivariate analysis; and
   generate the analysis image including the analysis result and the feature.

6. The image analysis apparatus according to claim 1, wherein the one or more processors are further configured to:
   acquire the color image of the measurement target from the measurement device; and
   generate the analysis image including the color image in which the target range is displayed.

7. The image analysis apparatus according to claim 6, wherein the one or more processors are further configured to:
   calculate a plurality of index values indicating a feature of each pixel based on the gradation value of the respective pixel for each wavelength;
   generate the analysis image in which plot points indicating the analysis result for each pixel are plotted in a coordinate system, wherein the coordinate system includes coordinate axes corresponding to respective index values of the plurality of index values;
   display the analysis image on a display, when receiving a user operation for selection of a determined plot point on the analysis image displayed on the display;
   acquire the selected determined plot point as a selected point; and
   display a pixel corresponding to the selected point in the color image as a corresponding pixel.

8. A non-transitory computer-readable storage medium having stored thereon, computer-executable instructions which, when executed by a processor, cause the processor to execute operations, the operations comprising:
   acquiring, from a measurement device that includes at least one sensor, spectral images for a plurality of wavelengths, obtained by imaging a measurement target;
   acquiring a target range in each of the spectral images, wherein the target range is acquired based on designation of a portion of a color image corresponding to the spectral images;
   performing multivariate analysis of each pixel in the target range based on a gradation value of a respective pixel for each wavelength in the target range;
   generating an analysis image including an analysis result of the multivariate analysis for each pixel in the target range; and
   storing the generated analysis image into a memory.

* * * * *